Figure 1:
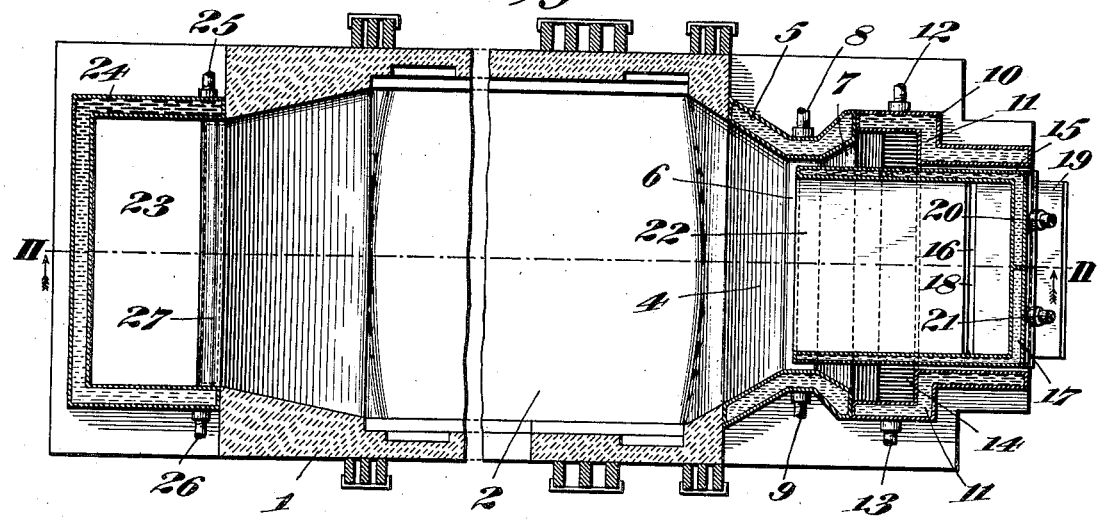

Dec. 19, 1922.    1,439,360

W. C. FRANK,
FURNACE PORT,
FILED OCT. 28, 1921.

INVENTOR
*William C. Frank.*
BY
*Geo. E. Thackray*
ATTORNEY

Patented Dec. 19, 1922.

1,439,360

UNITED STATES PATENT OFFICE.

WILLIAM C. FRANK, OF JOHNSTOWN, PENNSYLVANIA.

FURNACE PORT.

Application filed October 28, 1921. Serial No. 511,222.

*To all whom it may concern:*

Be it known that I, WILLIAM C. FRANK, a citizen of the United States, and a resident of the city of Johnstown, county of Cambria, and State of Pennsylvania, have invented new and useful Improvements in Furnace Ports; and I do hereby declare the following to be a full, clear, and exact description of the invention, such as will enable others skilled in the art to which it appertains to make and use the same.

My invention relates to a furnace port adapted for use in connection with a gas-fired furnace preferably, and it may be applied to those of the regenerative, recuperative, or direct-fired type, but I prefer to use it in connection with a regenerative or recuperative furnace.

My invention in general consists of a form of blow-pipe or eduction type of port, having a gas nozzle, the inner end of which is inserted within the inlet port of a furnace. Gas is supplied under suitable pressure to the gas nozzle and air is supplied around the same, and is aspirated or drawn in by the gas flow and mixes with the gas, which thereby produces a thorough mixture and consequent quick combustion.

In order that the operation of the furnace may be rapid and the gas flow not limited by back pressure, I provide at the other end of the furnace an outlet port of much larger area than the inlet and this combination results in quick combustion, high temperature and quick working owing to the thorough mixture, combustion and quick travel of the gases and the rapid exit of the products of combustion from the furnace.

My gas nozzle is provided with regulating means whereby more or less gas may be introduced therein and both the gas nozzle and the entrance port through which the air is admitted and the mixture of air and gas delivered to the furnace may be made of metal and water-cooled in order to preserve their form so that they will operate to the best advantage.

In order to obviate the possibility of the destruction of the port and gas nozzle by the heat of the outgoing gases, I have arranged my construction as a one-way furnace, namely, a gas nozzle air port and combined entrance port only at one end of the furnace. The furnace may be of the regenerative or recuperative type and provided with the usual air and gas heat exchangers, whereby the heat of the products of combustion is communicated to the incoming air and gas.

The arrangement of the flues, dampers, reversing and regulating valves, recuperators or regenerators with this furnace forms no part of this invention, but will be reserved for other applications for United States patents, and my present invention relates to the construction and arrangement of the furnace ports in connection with the furnace itself, and the passages connecting directly therewith.

My invention is applicable to various types of furnaces for heating metal, etc., but for the purpose and ease of simplicity of description and illustration I have confined myself herein to its use with an open hearth steel melting furnace.

Having thus given a general description of my invention, I will now, in order to make the matter more clear, refer to the annexed sheet of drawings, and in which like characters refer to like parts.

Figure 2:
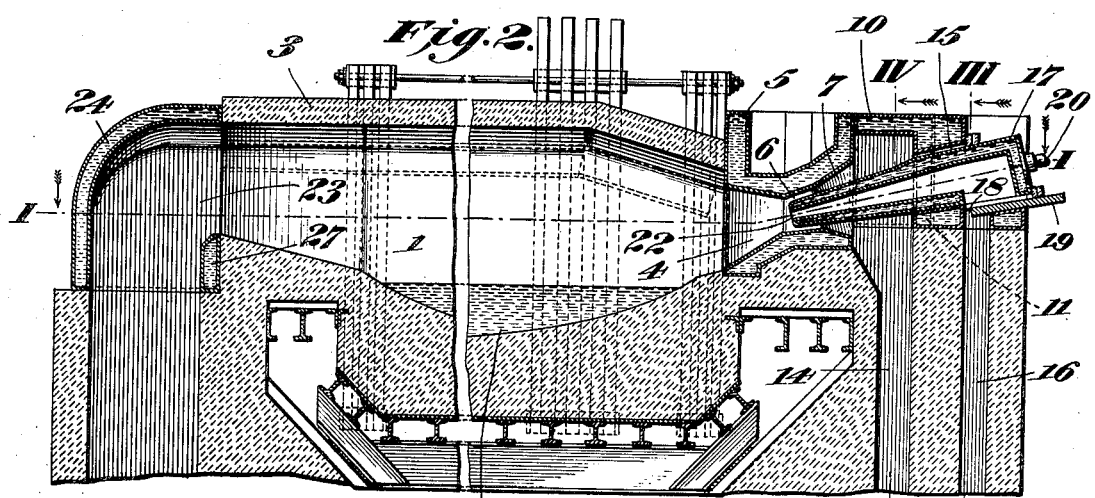
Figure 3:
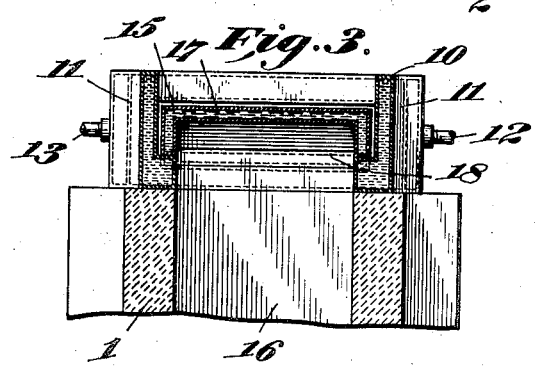
Figure 4:
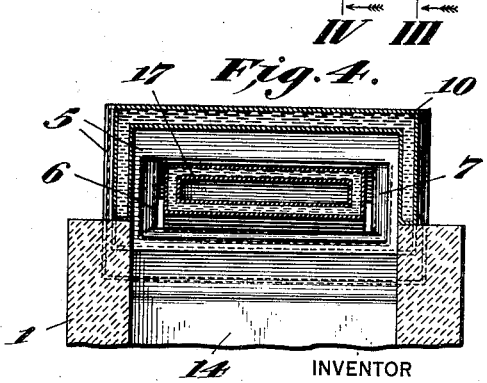

Figure 1 is a horizontal sectional elevation through an open hearth furnace with the central portion of the furnace broken away, illustrating the application of my invention, this section being taken on the line I—I of Figure 2; Figure 2 is a vertical longitudinal sectional elevation of the furnace shown in Figure 1 taken on the line II—II of Figure 1; Figure 3 is a vertical transverse sectional elevation through the end of the furnace taken on the line III—III of Figure 2, and Figure 4 is a vertical transverse sectional elevation through the end of the furnace taken on the line IV—IV of Figure 2.

Referring now to the characters of reference on the drawings:—1 indicates the furnace as a whole, 2 the hearth thereof, 3 the roof and 4 is the inlet port. This inlet port is made with an inwardly flaring opening 4 entering into the furnace with a constricted portion 6 adjacent the end of the gas nozzle, which is inserted therein and also formed with an outwardly flaring opening 7, as illustrated. The port which forms the entrance 4 consists of a water-cooled box portion 5, which is shaped as above described and is arranged to have a considerable width at the end of the furnace, forming a slot or opening through which the combined gases are discharged into the furnace. The water-cooled box 5 is provided with inlet and outlet pipes 8 and 9 for supplying cooling fluid thereto and delivering the same therefrom in order to keep it cool and maintain its form. I also provide a water-cooled box 10, which surrounds the rear end of the gas nozzle 17, and this is provided with an offset portion 11 as illustrated, the rear part being contracted as shown, and inlet and outlet pipes 12 and 13 are provided for supplying cooling fluid to and exhausting the same from the box 10. An air inlet flue 14 is provided, which is connected to the air regenerator or heat exchanger and supplies heated air therefrom, which is controlled in any usual manner. I provide an opening 15 in the rear end of the water-cooled box 10, through which the gas nozzle 17 is inserted as illustrated. The furnace is also provided with a gas inlet flue 16, which may be connected to the gas regenerator or heat exchanger and may be provided with any usual means for regulating the supply of gas thereto. The supply of gas from the flue or channel 16 is delivered to the interior of the gas nozzle 17 through the opening 18, the size of which may be regulated by the sliding damper 19, which is adapted to slide back or forth and close or open or partially open the connection between the flue 16 and the gas nozzle 17. The gas nozzle 17 is preferably long and tapering as shown and is provided with inlet and outlet pipes 20 and 21 to provide circulation of cooling fluid therein. The mouth or opening of the gas nozzle is 22, through which gas is supplied and air is supplied around the same in the space 6 between the end of the nozzle and the water-cooled box 5 at its constricted portion. This results in an aspirating effect for the reason that if the gas is delivered through the nozzle at any pressure it will draw in the air from the flue 14 after the manner of a venturi-like construction. At the other end of the furnace I provide a large outlet port 23, the area of which is larger than the inlet port so as to provide a ready exit of the products of combustion without choking the furnace, and around this I provide a water-cooled box 24 having inlet and outlet pipes 25 and 26 for maintaining the circulation of cooling fluid therein. I also provide another water-cooled box 27 for protecting that portion of the furnace to which it is adjacent.

Although I have shown and described my invention in considerable detail, I do not wish to be limited to the exact and specific details thereof, as shown and described, but may use such modifications in, substitutions for, or equivalents thereof as are embraced within the scope of my invention or as pointed out in the claims.

Having thus described my invention, what I claim and desire to secure by Letters Patent is:—

1. A furnace port, comprising a wide inwardly flaring slot-shaped combined air and gas entrance, having also a rearwardly flaring rear opening and an intermediate constricted portion, a wide gas nozzle, the end of which is inserted therein and adjacent to the constricted portion thereof, and means for supplying combustible gases thereto.

2. A furnace port of the construction described in claim 1, also including means for the circulation of cooling fluid through the spaces between the walls of the port and gas nozzle.

3. A furnace port comprising the construction set forth in claim 1, and a sliding damper in connection with the gas nozzle, whereby the flow of gas may be adjusted or controlled.

4. A furnace port comprising the construction described in claim 1, and means for supplying heated air to the space between the gas nozzle and entrance port and heated gas to the gas nozzle.

5. In a one-way furnace, an entrance port at one end thereof as described in claim 1, and an exit port at the other end of considerably larger area than the entrance port.

In witness whereof I hereunto affix my signature.

WILLIAM C. FRANK.